(No Model.)

J. P. COBB.
FEEDING MECHANISM FOR THRASHING MACHINES.

No. 250,786. Patented Dec. 13, 1881.

Witnesses
Geo. H. Strong.
Frank D. Brooks

Inventor
John P. Cobb
By Dewey & Co.
Attys

UNITED STATES PATENT OFFICE.

JOHN P. COBB, OF COLLEGE CITY, CALIFORNIA.

FEEDING MECHANISM FOR THRASHING-MACHINES.

SPECIFICATION forming part of Letters Patent, No. 250,786, dated December 13, 1881.

Application filed September 6, 1881. (No model.)

*To all whom it may concern:*

Be it known that I, JOHN P. COBB, of College City, county of Colusa, State of California, have invented an Improved Feeding Mechanism for Thrashing-Machines; and I hereby declare the following to be a full, clear, and exact description thereof.

My invention relates to certain improvements in feeding or regulating mechanism for thrashing-machines, the object of which is to regulate or distribute the unthrashed straw and grain as it passes upon the elevator from the derrick-wagon to the feeding device which introduces it to the thrashing-cylinder.

It consists in new and useful devices attached to and situated over the elevator, said device having independent reciprocating oscillating pickers or tines operating over the elevator, said tines being adapted to have a vertical adjustment as a whole, and to have a separate individual adjustment to regulate their stroke, all of which, together with the object and advantage of the invention, will hereinafter more fully appear, reference being made to the accompanying drawings, in which—

Figure 1:
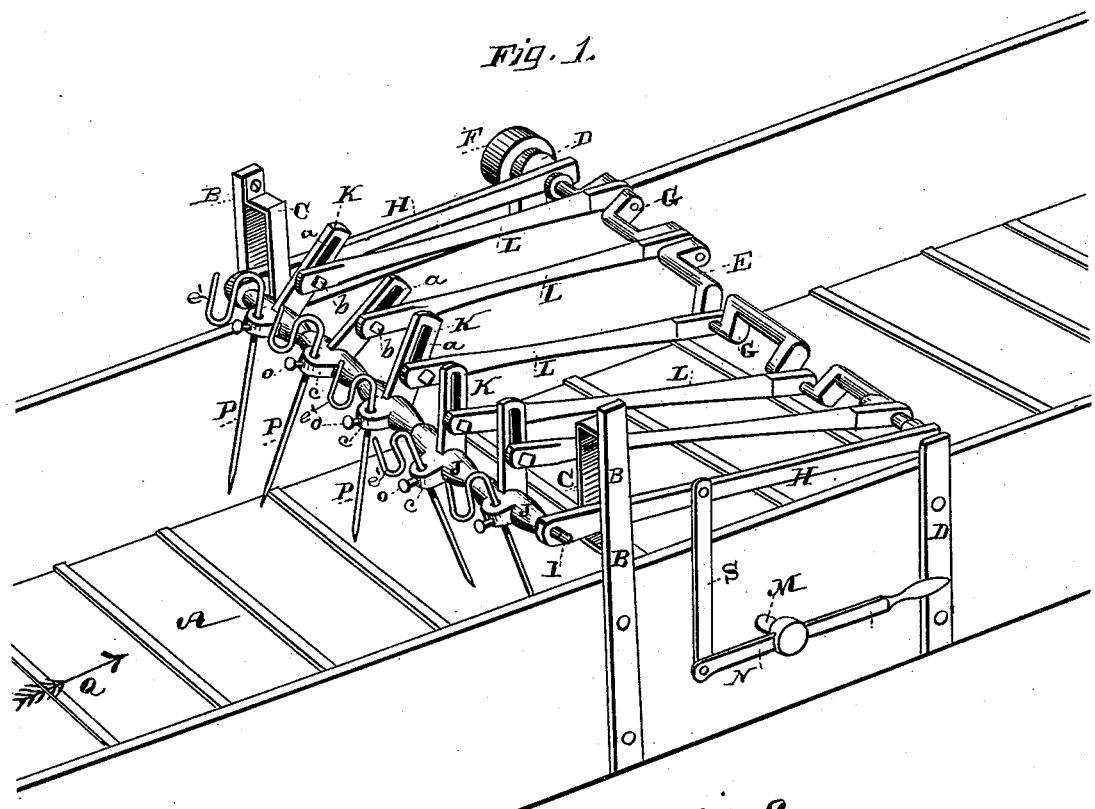
Figure 2:
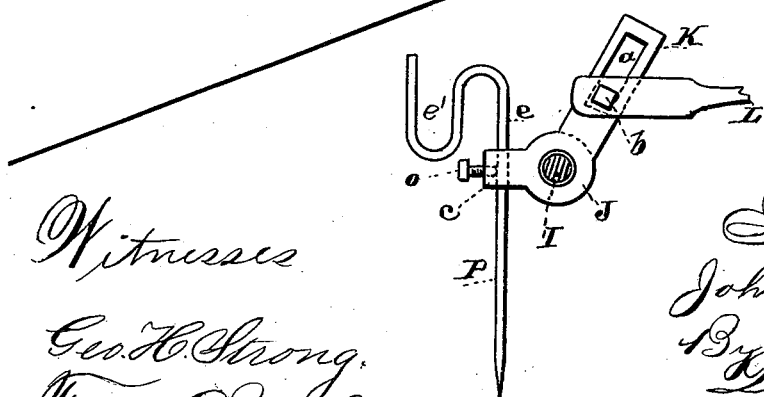

Figure 1 represents a perspective view of a device embodying my invention. Fig. 2 is a detail view in further illustration of my invention.

The unthrashed wheat and straw are taken from the stacks by the derrick-forks and loaded upon the derrick-wagon. From this wagon to the thrashing-machine extends an endless belt, called the "elevator." Upon this the straw is fed from the derrick-wagon, and by it is carried up to the thrashing-cylinder, or, where a feeding device is used, up to it, and by it is pushed or fed into said cylinder. The operation of putting the straw upon the elevator is accomplished by hand, and therefore there can be no accuracy in regulating the quantity, for it is picked up in bunches, and it is necessary to keep the feed somewhat constant. Large masses or bunches of straw will pass up the elevator, and as the object of a feeder is simply to push it into the cylinder, it is all pushed in and the cylinder choked.

My device is intended to regulate the feed before it reaches the feeder, and this is accomplished by tearing and picking the bunches and breaking up the masses, and permitting their passage in equal quantities A represents the elevator-belt, one end of which may be supposed to be in relation with the derrick-wagon and the other with the feeding device or cylinder. To the sides of the frame of the elevator are secured standards B B, having on their inner sides vertical guide slots C. These standards are sufficiently removed from the derrick wagon to allow a proper space upon which to throw the straw. Secured to the sides, a little farther on toward the thrashing-machine, are other standards, D, in the tops of which is journaled a shaft, E, carrying on one end a pulley, F.

Journaled upon the shaft E, just inside the standards D, are side bars, H, which extend through the guide-slots C and project beyond. In their ends is an axle or cross-rod, I, rigidly secured therein. Upon the axle I are hubs or sleeves J, (five here shown.) They are loose upon the axle, and have projecting arms K, which have slots *a*.

L represents connecting rods or pitmen attached to the cranks G. Their other ends are pivoted to the arms K by means of bolts *b* passing through the slots *a* of said arms. Under the top portion of the elevator-belt, and between that and the lower part which passes back, is a transverse rocking shaft, M, properly supported, as shown. To its ends are attached lever-arms N, to which are attached upright rods S. These extend up by the side of the frame, and are attached to the side bars, H.

N is a lever attached to the rocking bar. By drawing this lever down the rods S and the side arms, H, with their axle and hubs, are elevated in the guide-slots C. The hubs or sleeves J have a small projection, *c*, on their forward sides, in which are holes. Through the holes are fitted the tines or pickers P. These tines are of the shape shown, having a straight downward portion, (marked *e*,) extending from above the projection *c* downwardly, and a curved upper portion, *e'*, as shown. The tines are secured by small set-screws *o*, and may be adjusted vertically independently when necessary. Power is applied to the pulley F from any suitable pulley upon the thrashing-machine. As the shaft E is revolved the pitmen L cause the hubs J to oscillate, and the tines P move back and forth reciprocally through an arc of a circle over the elevator.

The straw is fed upon the elevator, and proceeds in a direction indicated by the arrow Q. On account of the position of the cranks G the pickers follow each other, no two moving together. The advantage of this is that the straw never has a chance to pass in a mass or bunch, because at no time are all the tines raised sufficiently from the elevator to allow it. There is always one of them perpendicular and near enough to the elevator to prevent the bunches from passing. This would not be the case if all the tines were in line and moved back and forth together upon a single shaft. The tines tear the bunches apart by their reciprocating movement, and regulate the straw, so that it passes evenly and is fed to the cylinder by the feeder without danger of choking. The peculiar shape of the upper portion of the tines facilitates the operation. Some of the straw would be liable to rise up and get on top of the projections c, but the shoulders e′ hold it down and press it, so that it can pass freely.

By loosening the bolts b the pitmen L may be moved up or down in the slots a and secured, thus adjusting the stroke of the tines, when necessary.

When long straw is passed through to the thrashing-machine it does not require as much check as when short straw is being worked, because the proportion of grain in the former being less, the same amount will not clog the riddles; but when short straw is passed through, it requires to be checked more, for it is more likely to interfere with the thrasher by choking the riddles. The vertical adjustment of the tines either separately or together provides for this. By the lever O they may be raised or lowered all together. When long straw is passing they may be raised. When short straw is being fed they may be lowered, so that they may tear the bunches better.

What I claim, therefore, as new, and desire to secure by Letters Patent, is—

1. In combination with an elevator-belt adapted to carry straw to the thrashing-machine, the side bars, H, axle I, independent oscillating hubs or sleeves J, having pickers or tines P, and arms K, pitmen L, cranks G, and revolving shaft E, arranged substantially as and for the purpose herein described.

2. In combination with a grain-elevator belt, the side bars, H, standards B, having guide-slots C, axle I, independent oscillating hubs J, provided with pickers or tines P, pitmen L, cranks G, and revolving shaft E, arranged substantially as and for the purpose herein described.

3. A grain-elevator belt, the independent oscillating hubs or sleeves J having pickers or tines P, said hubs having slotted arms K, in combination with the side bars, H, axle I, pitmen L, secured to said arms K, and adapted to be adjusted in the slots a thereof, cranks G, and revolving shaft E, arranged substantially as and for the purpose herein set forth.

4. In combination with the axle I, the independent oscillating hubs J, pickers or tines P, and mechanism for oscillating the said hubs, said tines being bent to form a downwardly-projecting shoulder, e′, and secured to the hubs by set-screws o, whereby they may be separately adjusted, substantially as and for the purpose herein described.

In witness whereof I have hereunto set my hand.

JOHN P. COBB.

Witnesses:
F. P. GLASS,
B. TOLSON.